United States Patent [19]

Feuvray

[11] 4,429,894
[45] Feb. 7, 1984

[54] FASTENING DEVICE FOR A TRAILER AND TRAILER COMPRISING SUCH A DEVICE

[76] Inventor: Alain Feuvray, 21 rue de Lattre de Tassigny, 71100 Chalon sur Saone, France

[21] Appl. No.: 214,052
[22] PCT Filed: Jan. 2, 1980
[86] PCT No.: PCT/FR80/00001
§ 371 Date: Aug. 28, 1980
§ 102(e) Date: Aug. 28, 1980
[87] PCT Pub. No.: WO80/01372
PCT Pub. Date: Jul. 10, 1980

[30] Foreign Application Priority Data

Jan. 3, 1979 [FR] France .................... 79 00077
Jan. 2, 1980 [FR] France .................... 80 00001

[51] Int. Cl.³ .............................. B60D 1/14
[52] U.S. Cl. ........................... 280/458; 280/474
[58] Field of Search ............ 280/458, 459, 460 R, 280/474, 448, 446 B, 408

[56] References Cited

U.S. PATENT DOCUMENTS 2,313,235 3/1943 Grove et al. ................. 280/458
4,127,202 11/1978 Jennings et al. ............ 280/408 X

FOREIGN PATENT DOCUMENTS 2006819 2/1971 Fed. Rep. of Germany .
Ad.38345 5/1931 France .
Ad.85495 8/1965 France .
1483756 7/1967 France .

Primary Examiner—John A. Pekar
Attorney, Agent, or Firm—Young & Thompson

[57] ABSTRACT

A trailer has a coupling by which it is coupled to a towing vehicle. A coupling comprises two crossed-arms one end of each of which is articulated to the trailer and the other end of which is adapted to be hooked to the towing vehicle. The wheels of the trailer are mounted for swivelling movement about upwardly forwardly inclined pivotal axes; and the horizontal axes of rotation of the wheel are disposed to the rear of these pivotal axes so that the tractor wheels follow the path of the vehicle wheels.

2 Claims, 6 Drawing Figures

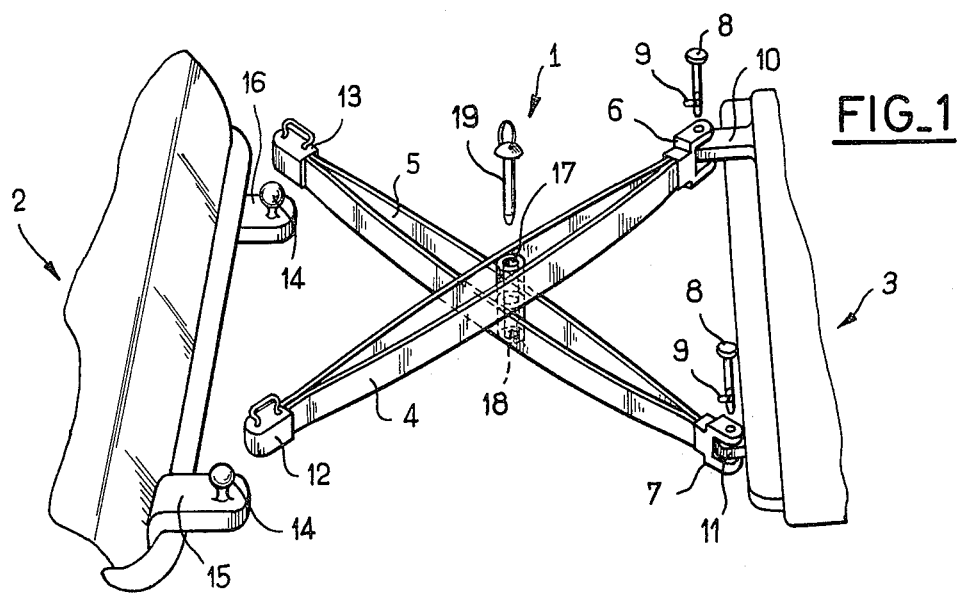
FIG_1
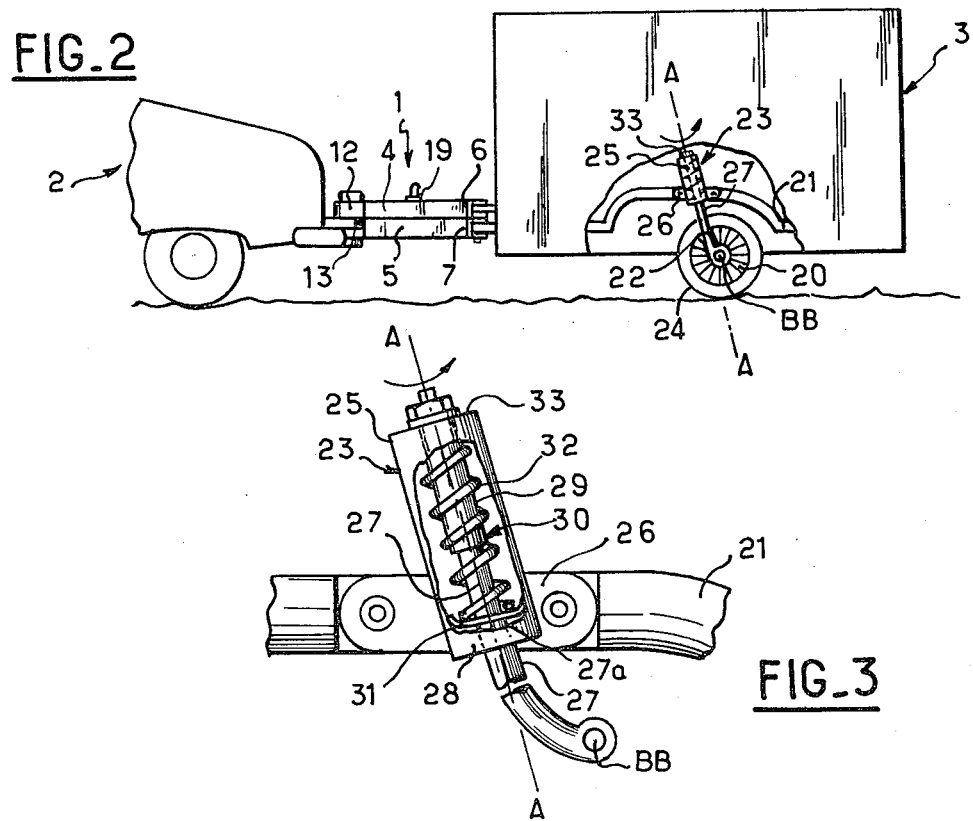
FIG_2
FIG_3

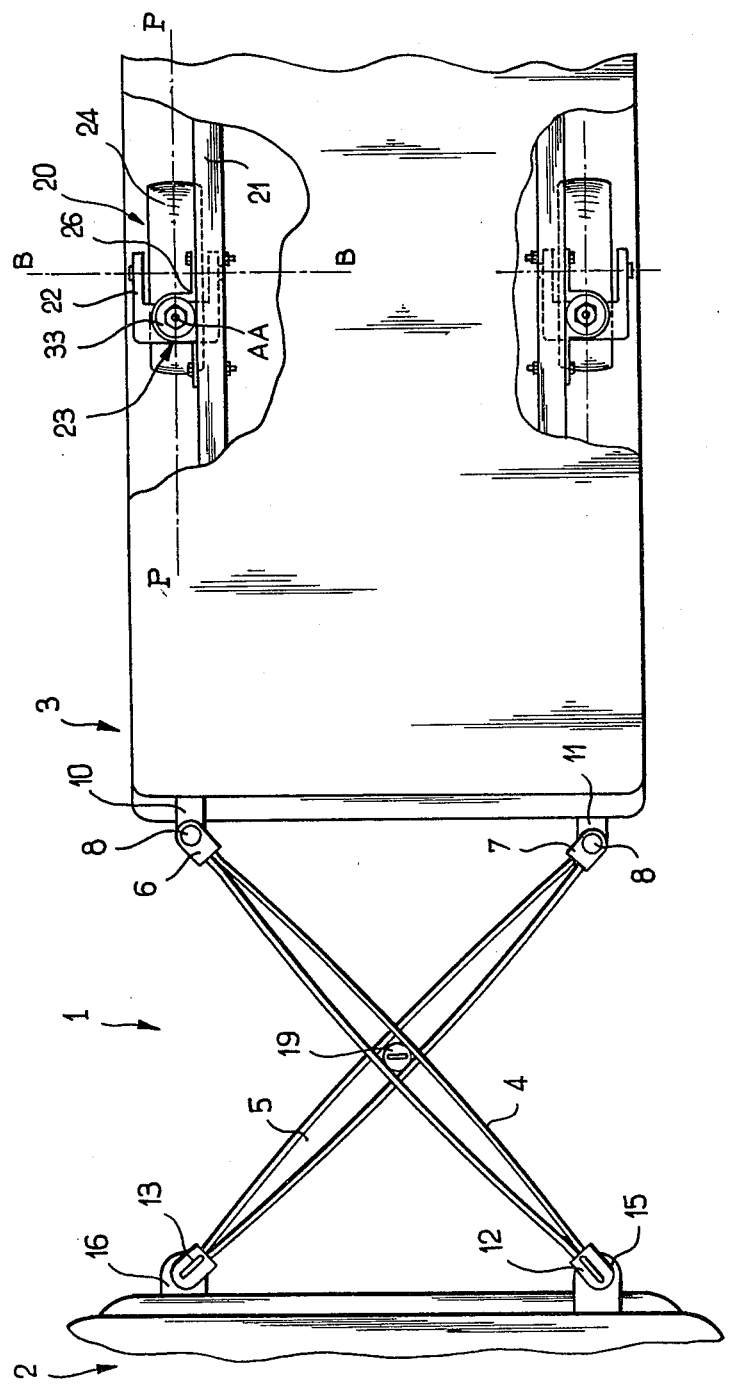

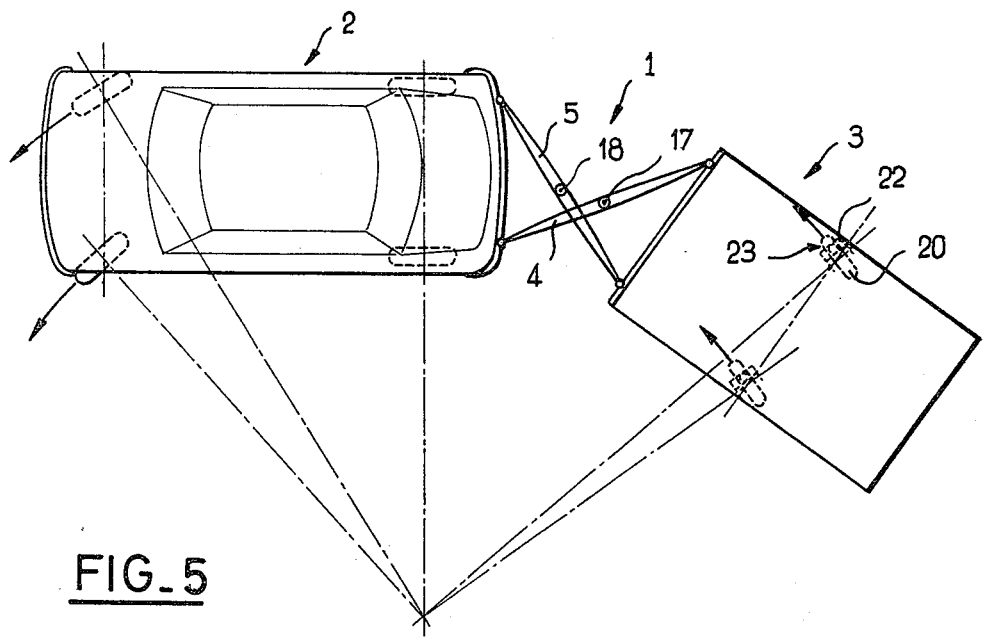
FIG_5
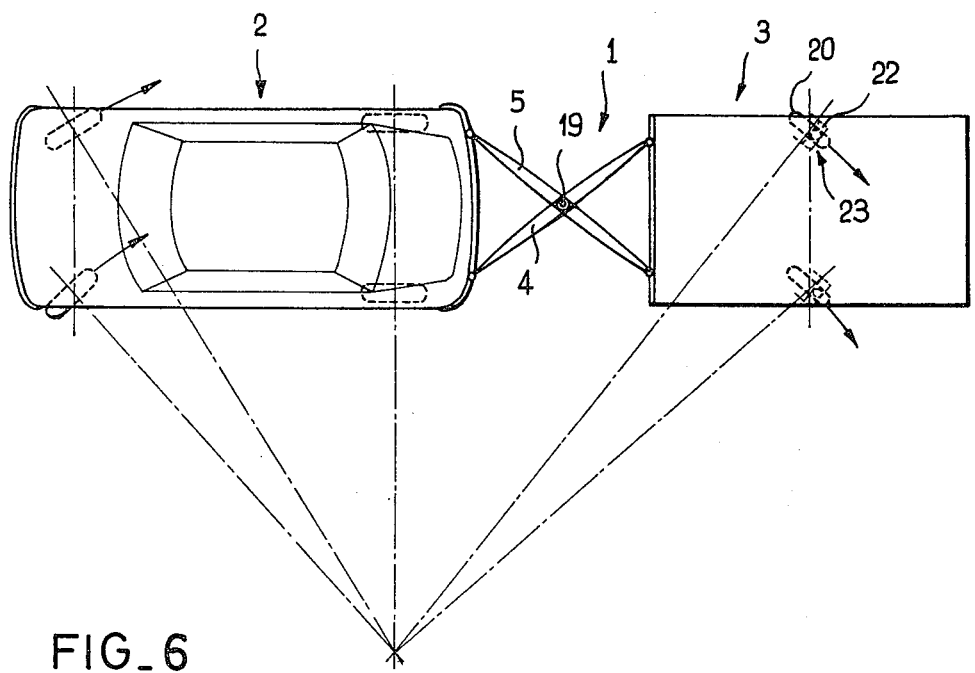
FIG_6

FASTENING DEVICE FOR A TRAILER AND TRAILER COMPRISING SUCH A DEVICE

The present invention relates to a coupling device for a trailer.

The invention relates also to a trailer, in particular of the caravan type, comprising such a coupling device.

BACKGROUND OF THE INVENTION

Known coupling devices comprise, mostly, a jib or draft bar fixed rigidly to the trailer and whose free end is designed to be hooked to the rear of a towing vehicle.

It is generally very difficult to manoeuver in reverse, a trailer coupled to the towing vehicle by means of the aforesaid device. If the trailer is not initially perfectly aligned with the towing vehicle, as soon as the latter starts to move back, the trailer has a tendency to pivot with respect to the towing vehicle, thereby departing from the path desired by the driver. Through this fact, manoeuvres rearwards can only be carried out for very short distances.

BRIEF SUMMARY OF THE INVENTION

The object of the present invention is to overcome this drawback by producing a coupling device for a trailer enabling movement in reverse to be carried out easily without spoiling the ease of forward driving of the towing vehicle to which the trailer is coupled.

According to the invention, the coupling device for a trailer is characterised in that it comprises two crossed arms each including an end hinged to the trailer and an end designed to be hooked to the rear of the towing vehicle and in that locking means are provided to maintain these two arms in a symmetrical position with respect to the longitudinal middle plane of the trailer when moving rearwards. To manoeuvre the trailer rearwards, it suffices to lock the locking means of the arms, so that the trailer no longer pivots with respect to the towing vehicle. To move forward, the driver disengages the locking means, so that the arms can be oriented independently of one another according to the respective paths of the towing vehicle and the trailer.

In a preferred embodiment of the invention, the locking means comprise an orifice formed in each of said arms at the point where the latter cross when the towing vehicle and the trailer are aligned, and a bolt removably engaged in these two orifices.

In this embodiment, once the bolt is in place in the two opposite orifices, the two crossed arms are held in a position such that the vehicle and the trailer are aligned. The positioning of the bolt is particularly easy when one of the orifices is of oblong cross-section.

The invention also relates to a trailer comprising the aforesaid coupling device. This trailer is characterised in that its wheels are fixed to its chassis by means of slightly inclined pivots (when the trailer is placed on horizontal ground), the axis of each pivot not cutting the axis of the corresponding wheel and said axis of each pivot being substantially situated in the longitudinal plane of the tread of the corresponding wheel.

Thus, to carry out rearward movement along a curved path, the crossed arms of the coupling device are locked, as explained above. In the course of the rearward movement, the wheels of the trailer pivot around their respective pivot to be spontaneously oriented along the path desired by the driver of the towing vehicle, which path is defined by the orientation of the front wheels of this vehicle. Since the pivots are inclined, the trailer follows the path of the towing vehicle in forward movement faithfully.

BRIEF DESCRIPTION OF THE DRAWINGS

Other features and advantages of the present invention will emerge also from the following description. In the accompanying drawings, given by way of non-limiting example:

FIG. 1 is a diagrammatic view in perspective of the coupling device according to the invention, FIG. 2 is a side elevation with parts torn away of a trailer comprising a coupling device according to the invention and coupled to a towing vehicle, FIG. 3 is a view on a large scale with a part torn away of a wheel pivot of the trailer according to FIG. 2, FIG. 4 is a plan view, with part torn away, of the trailer, showing the mounting of the wheel, FIG. 5 is a plan view showing the trailer coupled to a towing vehicle moving forwards, and FIG. 6 is a plan view showing the trailer coupled to a towing vehicle moving rearwards.

DETAILED DESCRIPTION OF THE INVENTION

With reference to FIG. 1, the coupling device 1 serves to couple a trailer 3 to a towing vehicle 2. The device 1 comprises principally two crossed arms 4, 5. These crossed arms 4, 5 comprise, at their rear ends, forks 6, 7 designed to be pivotably connected, by means of bolts 8 provided with a retractable catch 9, to respective lugs 10, 11 made fast to the trailer 3. The front ends 12, 13 of the crossed arms 4, 5 are designed to be fixed in articulated manner, to ball-joints 14 made fast to the towing vehicle 2, by means of fixing lugs 15, 16.

Each crossed arm 4, 5 includes between its two ends 6, 12, 7, 13 an orifice 17, 18. Said orifices 17, 18 are coaxial when the towing vehicle 2 and the trailer 3 are aligned, as shown in FIG. 1. A bolt 19 may be removably engaged in these two orifices 17, 18 when they are coaxial, to lock the crossed arms 4, 5 in a symmetrical position with respect to the longitudinal middle plane of the trailer 3.

The operation of the aforesaid coupling device is as follows:

To move rearwards, in a straight line, the driver of the towing vehicle 2 aligns the latter with the trailer 3, places the bolt 19 in the orifices 17, 18 and proceeds to move rearwards, the steering wheel of the vehicle 2 being oriented in a straight line. The trailer 3, fastened to the towing vehicle 2, hence can only move in a straight line.

To move forwards, the driver removes the bolt 19 and the coupling device 1 has the same advantages as known devices.

To carry out a rearward movement along a curved path the driver must remove the bolt 19 and proceed as in the case of known coupling devices, unless the trailer is as described below.

The coupling device 1, due to the crossed arms 4, 5 makes the overturning of the trailer 3 almost impossible unless the vehicle 2 overturns also.

With reference to FIGS. 2, 3 and 4, the wheels 20 of the trailer 3 are mounted on the frame 21 of the trailer 3 through a yoke 22 (see notably FIG. 4) and a pivot 23 inclined by about 15° towards the towing vehicle 2. The axis AA of the pivot 23 does not cut the axis BB of the wheel 20. The axis AA is, in addition, located substantially in the longitudinal middle plane PP of a tread 24 of the wheel 20. The frame 21 has a sufficient clearance for the wheel 20 to be pivotable freely around the axis AA.

FIG. 3 shows in more detail the constitution of the pivot 23. The latter comprises a cylindrical body 25 fixed to the chassis 21 by a flange 26. A rod 27 made fast to the yoke 22 is guided in the body 25 in rotation around the axis AA and in translation along the axis AA, on the one hand by means of a bore formed in a base 28 of the body 25 and, on the other hand in the cylinder 29 of a shock absorber 30, this cylinder 29 being fastened to the body 25. The rod 27 has a shoulder 27a on which a cup 31 free in translation in the body 25, is supported. A helical spring 32 is positioned between the cup 31 and a bottom 33 of the body 25.

To carry out a rearward movement, the driver of the towing vehicle 2 places the bolt 19 in the orifices 17, 18 of the crossed arms 4, 5, as explained with reference to FIG. 1 and thus renders the trailer 3 fast to the vehicle 2. As soon as the towing vehicle 2 starts to reverse, the wheels 20 pivot around the axis AA of the pivots 23, so that the axis BB is situated between the coupling device 1 and the axis AA of these pivots 23.

If the vehicle 2 reverses in a straight line, all occurs as explained with reference to FIG. 1. If the vehicle reverses around a curved path, it is seen from FIG. 6 that the wheels 20 are oriented around their pivots 23 in accordance with the path determined by the front wheels of the vehicle 2. The rearward manoeuvres are hence considerably facilitated since the path of the trailer cannot depart from that of the towing vehicle. To move forwards, the driver of the vehicle 2 lifts out the bolt 19 and proceeds as in the case of a trailer provided with an oridinary coupling device. On a curve driving forwards, as shown in FIG. 5, the orifices 17, 18 of the crossed arms 4, 5 are no longer held coaxial, so that the trailer 3 can pivot freely with respect to the vehicle 2. In addition, the wheels 20 pivot around the axis of their pivots 23 in accordance with the path of the vehicle 2. As the pivots 23 are inclined, sudden or untimely movements of the trailer 3 with respect to the vehicle 2 are avoided.

Of course, the invention is not limited to the examples which have just been described and numerous modifications or improvements may be applied to the coupling device 1 and to the trailer 3 without departing from the scope of the invention.

Thus friction means may be provided between the crossed arms 4, 5 to stabilise still better the path of the trailer 3 with respect to that of the vehicle 2. The locking means, and in particular the bolt 19, may be actuated from inside the vehicle through mechanical, hydraulic or electromagnetic control means. These control means could be associated with the gear box of the vehicle 2 so that the bolt 19 is automatically engaged in the orifices 17, 18 of the crossed arms 4, 5 when the gear box is in reverse position, and is automatically disengaged when the gear box is in forward drive position.

The inclination of the pivots 23 may be obtained or modified by the dipping forwards of a trailer perched high on its two pivoting wheels and coupled low and short to the towing vehicle.

It is also possible to provide for the control means of the bolt 19 to be connected to the pivot 23, so that the bolt 19 is engaged in the orifices 17, 18 as soon as the axis BB is located between the coupling device 1 and the axis AA of the pivots 29, and is disengaged in the reverse case.

One of the orifices 17, 18 may be of oblong section so as to facilitate the positioning of the bolt 19.

The pivot 23 may include locking means to permit the locking of the wheels 20 in rotation around the axis AA, so that the plane PP is parallel to the longitudinal middle plane of the trailer. In this embodiment, the driver can lock the wheels 20 in this position when he moves forwards, and thus confer better stability on the trailer 3. These locking means may be controlled from inside the vehicle 2 by mechanical, hydraulic or electromagnetic control means, and if necessary connected to the gear box of the vehicle 2 to ensure the locking of the wheels 20 when the gear box is in forward drive position and unlocking when the gear box is in rearward drive position.

It is also possible to provide for the wheels 20 to be coupled so as to keep them oriented in accord with one another around their respective pivot 23. This can be carried out by means of a coupling bar of which each end is connected to a respective link rod fast to the corresponding rod 27 which, in this case, will pass beyond the bottom 33 of pivot 23. The locking means provided in the preceding paragraph could then act on the link rods or on the coupling bar.

I claim:
1. A trailer having wheels and a coupling device comprising two crossed arms each including a first end articulated to the trailer and a second end adapted to be hooked to a towing vehicle, an orifice formed in each of said arms at the point where the arms cross when the towing vehicle and the trailer are aligned, a bolt removably engaged in these two orifices coaxially aligned to lock the crossed arms together in a symmetrical position with respect to the longitudinal middle plane of the trailer, pivots fixed to the trailer, the wheels of the trailer being rotatably mounted on said pivots about axes disposed rearwardly of the axes of the pivots so that the wheels of the trailer are oriented around said pivots to follow the path of the front wheels of the towing vehicle.

2. Trailer according to claim 1 wherein each said pivot is inclined forwardly upwardly.

* * * * *